(12) United States Patent
Falkenberg et al.

(10) Patent No.: US 6,388,891 B1
(45) Date of Patent: May 14, 2002

(54) FIBER SHELF ASSEMBLY

(75) Inventors: Dean R. Falkenberg, Windsor; John C. Hanners, Cotati; Edward T. Iwamiya, Petaluma, all of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/607,405

(22) Filed: Jun. 30, 2000

(51) Int. Cl.[7] .............................. H05K 7/14; H05K 7/18
(52) U.S. Cl. ...................... 361/796; 361/802; 361/825; 361/797; 385/134; 385/135; 385/137
(58) Field of Search ................................ 361/796, 797, 361/801, 802, 814, 825, 686, 724, 737, 753, 826, 827; 385/135, 134, 136, 137; 174/100, 60, 71 C, 72 A, 97

(56) References Cited

U.S. PATENT DOCUMENTS

| 4,911,662 A | | 3/1990 | Debortoli et al. ........... 439/719 |
|---|---|---|---|
| 5,167,001 A | * | 11/1992 | Debortoli et al. ........... 385/135 |
| 5,412,497 A | * | 5/1995 | Kaetsu et al. ............... 359/163 |
| 5,511,144 A | * | 4/1996 | Hawkins et al. ............ 385/135 |
| 5,613,030 A | * | 3/1997 | Hoffer et al. ............... 385/135 |

* cited by examiner

Primary Examiner—Jayprakash N. Gandhi
Assistant Examiner—Hung Bui
(74) Attorney, Agent, or Firm—Skjerven Morrill MacPherson LLP; Theodore P. Lopez

(57) ABSTRACT

A shelf assembly and system, which reduces the potential for accidental disruption of service or damage to neighboring transmission elements in a telecommunications network. The present invention operates to guide the transmission elements or fiber cables to and/or from a mounting position, and in or out from either side of electrical and/or optical telecommunications equipment. Fiber cables coupled at the mounting positions can be directed through reversible and removable fiber channels. Each fiber channel has a smooth surface and a radius of curvature, which provides an appropriate bend radius for guiding, routing, or bending the fiber cables into a fiber trough.

20 Claims, 5 Drawing Sheets

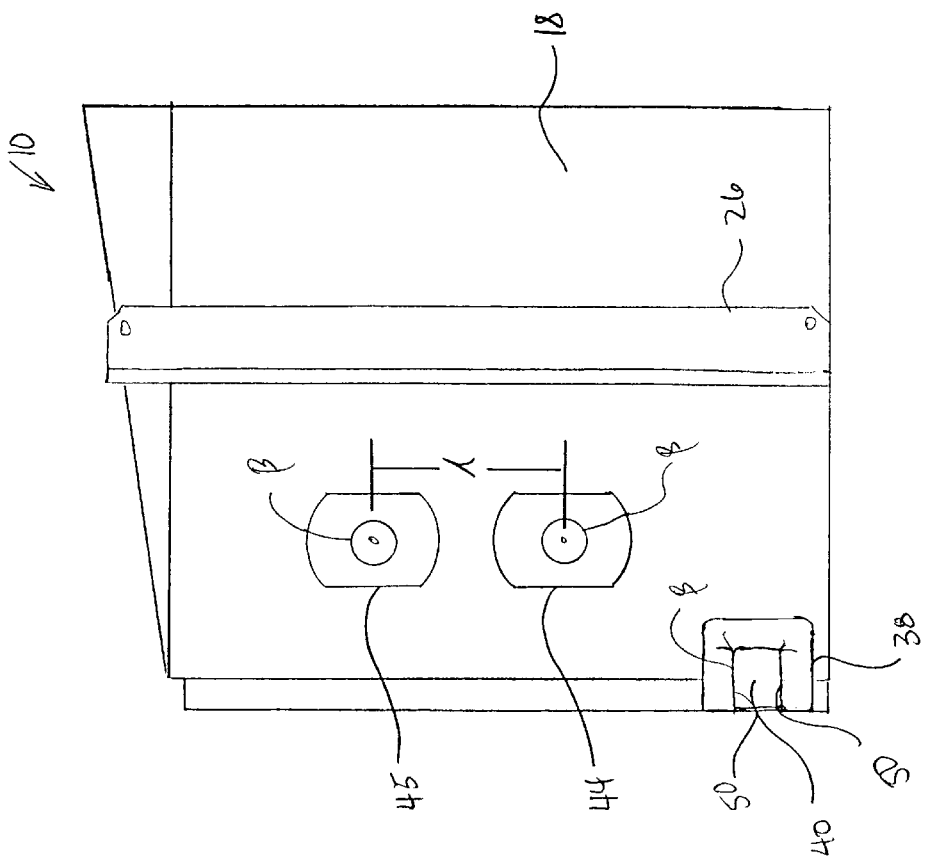

FIBER SHELF ASSEMBLY

BACKGROUND OF THE INVENTION

Most modern equipment for implementing telecommunications systems contain one or more electronic apparatus housed in a casing. For example, optical switches can hold multiple, closely spaced, optical cards, enclosed in a casing having a front access door, side walls, and a backplane. Generally, at one end, the optical cards are electrically coupled to the backplane, which performs an interconnect function between the various cards within the casing. In most instances, the optical cards terminate at the other end with connectors for fiber optic cables. The close arrangement of the optics cards and fiber cables within the casing provides a space savings and the advantage of allowing the cards and cables to be removed/inserted independent of one another.

Unfortunately, there are drawbacks to the closely spaced card/fiber cable arrangement, as well. For example, fiber cables are at risk when service work is performed on the equipment, such as installation/removal of cards or fiber cables and/or replacement of equipment components, such as fans, filters, and the like. The fiber cables are typically allowed to dangle from the casing and may become easily dislodged, which may cause unwanted disruption in the service being provided by the equipment. The fiber cables may also become entangled with other equipment systems, which may pose a hazard to technicians and others who work in close proximity to the equipment system. Finally, because of the dangling nature of the fiber cables, undue strain may be placed on the fiber cables, which may cause them to become dislodged, to be chaffed against sharp edges, or else to break.

Installers of optical switching equipment have encountered other drawbacks when routing fiber cables into and out from optical switches. For example, it is often necessary to route fiber cables about sharp corners. Routing fiber cables around sharp corners is inherently problematic, since over time, any movement of the fiber cable relative to the sharp corner may cause chaffing and/or cuts to develop in the fiber cable. It also happens that fiber cables are pulled on during installation or repair with sufficient force so as to deform the fiber cable. Unfortunately, when fiber cables are bent beyond a certain limit (i.e. bend radius) or pulled on with sufficient force, the fiber cable can break or the signal traveling through the cable may be attenuated beyond acceptable operational limits.

SUMMARY OF THE INVENTION

The present invention provides a shelf assembly and system, which reduces the potential for accidental disruption of service or damage to neighboring transmission elements in a telecommunications network. The present invention is useful for guiding incoming or outgoing transmission elements, such as optical fiber cables, to and from the telecommunications network. The present invention operates to guide the fiber cables to or from a mounting position, and in or out from either side of electrical and/or optical telecommunications equipment.

The shelf assembly can include a card cage assembly, which defines an interior space for receiving plug-in cards, generally having telecommunications functionality. Each plug-in card includes at least one fiber cable mounting position disposed at a terminal end of the card. Fiber cables coupled at the mounting positions can be directed through reversible and removable fiber channels. In accordance with the present invention, each fiber channel has a smooth surface and a radius of curvature, which provides an appropriate bend radius for guiding, routing, or bending the fiber cables into a fiber trough. The fiber trough provides a pathway to openings at either side of the shelf assembly. Advantageously, at the open ends of the fiber trough are fiber guide devices, which provide a smooth, rounded exit/entry openings through which fiber cables are introduced into the shelf assembly. Advantageously, fiber reels can be disposed on an external portion of the card cage assembly, such that the fiber cables can be stored.

The present invention has many advantages, such as simultaneous bi-directional access and routing to the plug-in cards in the system, while maintaining an appropriate bend radius for each fiber cable. The smooth concave surface of the fiber channels as well as the smooth, rounded surface of the fiber guide device reduces the possibility of chaffing or cutting of the fiber cables during operations or servicing of the equipment. The fiber channels and the fiber guide are modular and removable, which allows for simple redirecting of the fiber cables within the fiber trough and avoids the need to locate the fiber cables along a tortuous path to reach the mounting positions. The present invention also allows a technician the ability to access components within the card cage assembly without crossing the fiber cable paths and therefore minimizes the potential for service disruptions.

Other uses, advantages, and variations of the present invention will be apparent to one of ordinary skill in the art upon reading this disclosure and accompanying drawings.

BRIEF DESCRIPTION OF THE DRAWINGS

FIG. 4 is a simplified side view of the shelf assembly of FIG. 1.

DETAILED DESCRIPTION

Figure 1:
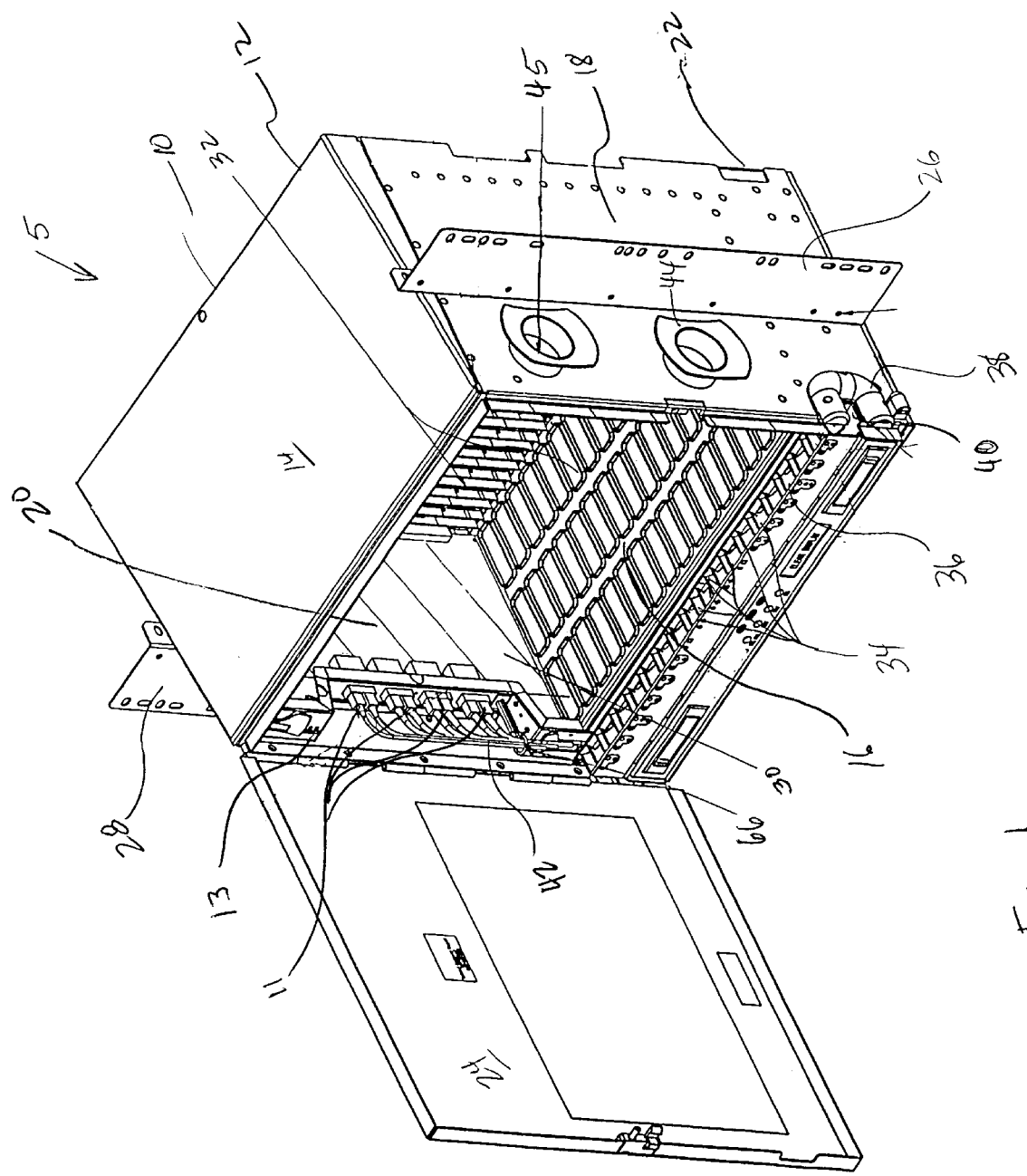
FIG. 1 is a perspective view of the fiber shelf assembly of the present invention.

FIG. 1 illustrates a fiber shelf assembly 5, which provides for connecting optical fibers of optical cables 7 to plug-in cards (not shown) having telecommunications functionality, such as for optical switching. Fiber shelf assembly 5 includes card cage assembly 10, for receiving vertically spaced apart plug-in cards, which terminate at a mounting position 11, having horizontally in-series spaced fiber cable mounts or terminals 13.

Card cage assembly 10 includes a housing or main chassis 12, having several components, such as top wall 14, bottom wall 16, side wall 18, side wall 20, back wall 22, and a front access door 24. Depending on the embodiment, chassis 12 may have mounting fixtures 26 and 28 located on the side walls 18 and 20 of chassis 12 to facilitate the mounting of assembly 10. Chassis 12 and mounting fixtures 26 and 28 may be made with sheet metal, injection molded plastic, or other similarly suited structural materials.

Chassis 12 defines an interior cavity or space 30. Interior cavity 30 is suitable for removably receiving one or more electronic apparatuses. In one embodiment, interior cavity 30 can be large enough to be capable of removably receiving electronic apparatuses, such as modules, PCAs, or other types of plug-in cards, which may provide a telecommunications functionality to shelf assembly 5. Front access door 24 provides access to interior cavity 30 for replacement, removal, assembly, servicing, and/or repair of the electronic apparatuses. Optionally, top and bottom walls 14 and 16 and back wall 22 may have a universal mounting 32, including slots or grooves used to support, guide, and align the plug-in cards while housed in interior cavity 30.

Figure 2:
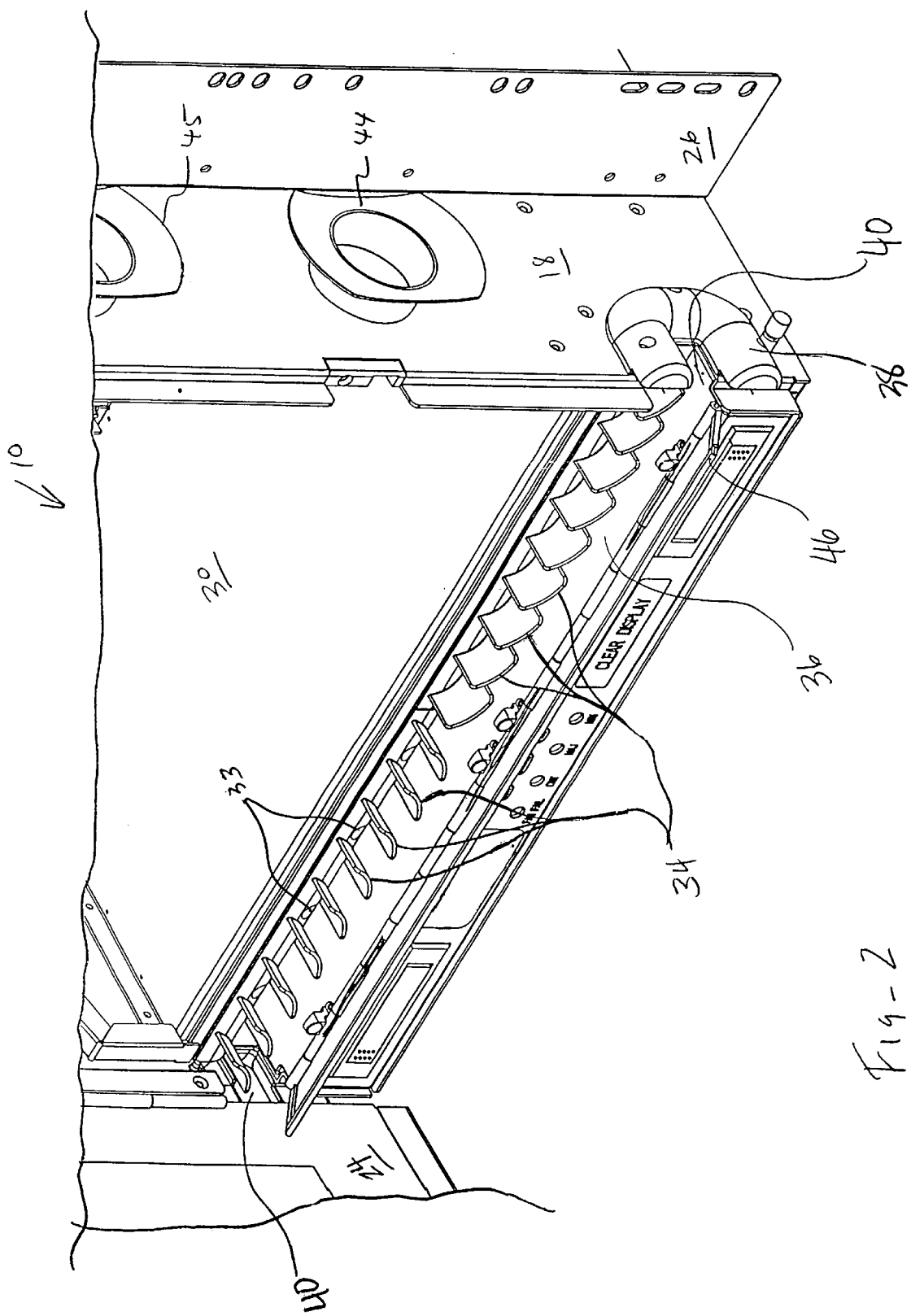
FIG. 2 is a magnified view of a portion of the shelf assembly of FIG. 1.

FIG. 2 is a magnified view of a bottom portion of fiber shelf assembly 5 showing a plurality of fiber channels 34, fiber trough 36, and fiber guide 38 in accordance with an embodiment of the present invention. As shown, fiber trough 36 extends the length of card cage assembly 10, along a bottom portion of the cage assembly. Fiber trough 36 provides a pathway for fiber cables routed to and from openings 40 and mounting positions 11 (FIG. 1). Accordingly, fiber trough 36 is sized to hold a plurality of fiber cables. Fiber trough 36 is enclosed with a fiber trough door 46. Fiber trough door 46 can be pivotally coupled to card cage assembly 10 using a conventional pivoting means, such as a hinge. Optionally, the hinge may be spring loaded, such that trough door 46 can close automatically. Trough door 46 protects the fiber cables being routed through fiber trough 36 and provides ease of access to the fiber cables.

Fiber guides 38 at the end of fiber trough 36 can be mounted on, or fabricated directly into, each side wall 18 and 20. Fiber guides 38 define and maintain openings 40 allowing fiber cables to be fed into or out from fiber trough 36. As illustrated in FIGS. 2 and 4, fiber guide 38 may have a square donut shape, with center hole or opening 40, and with a portion removed to allow fiber cables to be moved in and out of the fiber guide opening. Each fiber guide 38 can be formed on either end of fiber trough 36, on a portion of side walls 18 and 20. The internal surface 50 of fiber guide 38 is a cylindrical surface, made smooth to ensure that the fiber cables exiting or entering fiber trough 36 are not damaged or bent beyond acceptable limits. Accordingly, cylindrical surface 50 of fiber guide 38 can have a radius appropriate for whatever type of fiber cable is selected for use with fiber shelf assembly 5. In one embodiment, the radius of internal surface 50 is about 25 mm to about 28 mm. Since fiber guide 38 is formed at both side walls 18 and 20, fiber cables may be routed in or out of shelf assembly 5 from either side. Opening 40 can be any size appropriate for allowing numerous branches of fiber cables to exit/enter fiber trough 36. Typically, opening 40 can be approximately 34 mm×21 mm. Optionally, if fiber guide 38 is removed, opening 40 can be about 34 mm×35.5 mm. Fiber guide 38 can be pressed, rolled, extruded, or molded from sheet metal, plastic, and the like, using conventional fabrication techniques.

A plurality of fiber channels 34 are disposed in fiber trough 36 and are used to guide fiber cables from mounting positions 11 (FIG. 1) and into fiber trough 36 with an appropriate curved orientation. The curved orientation of each fiber channel 34 is selected to direct the fiber cables along fiber trough 36 toward openings 40. As shown in FIG. 2, fiber channels 34 extend into trough 36 and are positioned vertically in-series to correspond with a particular mounting position 11. The curved surfaces of fiber channels can be directed to either end of fiber trough 36. In one embodiment, at least half of the plurality of fiber channels 34 can be positioned to direct fibers toward one opening and the other half can be positioned to direct fibers towards the other end. Optionally, any number of fiber channels 34 can be made to direct fiber cables toward either opening 40.

Fiber channels 34 are curved to ensure that a proper curved orientation is provided with a minimum bend radius not to exceed a preselected curvature. For clarity a single fiber channel 34 is shown in FIG. 3A to illustrate the curvature and spacing of each fiber channel 34. Typically, the minimal bend radius for a fiber cable is a standardized value, which depends on the type of fiber cable. The curvature of fiber channels 34 can be designed to adhere to these standards for a preselected type of fiber cable. In accordance with these standards, for example, using a 3 mm type of fiber cable, the radius of curvature $\beta$ should be approximately 30 mm; and using a 2.5 mm type of fiber cable, the radius of curvature $\beta$ should be about 25 mm. In one embodiment, to ensure that an appropriate number of fiber cables can pass between each fiber channel 34, each fiber channel 34 in a series of channels 34 should be separated on center a length $\alpha$ of between about 21 mm and about 26 mm. For example, when using 8 of the 3 mm type fiber cables, the distance $\alpha$ should be about 25 mm.

Figure 3B:
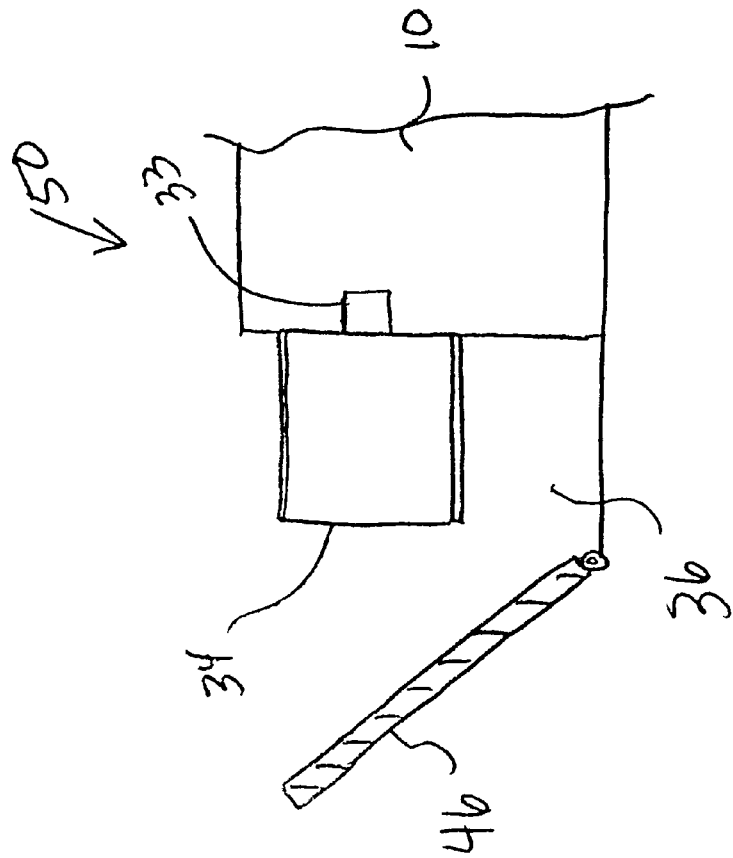
FIG. 3B is a simplified cross-sectional view of a single fiber channel mounted to the fiber shelf assembly of FIG. 1.
Figure 3A:
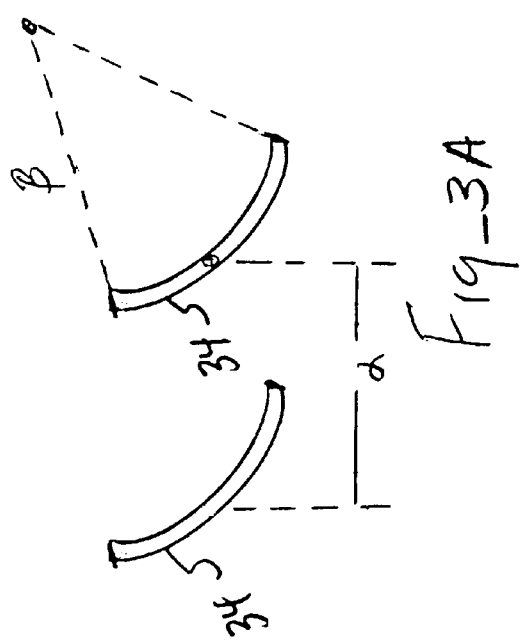
FIG. 3A is a simplified side view of the fiber channels of the present invention.

FIG. 3B is a simplified illustration of an isolated single fiber channel 34, which shows how each fiber channel 34 is mounted in trough 36. As shown in FIG. 3B, a fiber channel 34 is mounted to a bottom portion of cage assembly 10 using a conventional mounting means 33, such as screws, rivets, welds, and the like. Each fiber channel can be made from any lightweight, average strength material, such as plastic, using conventional fabrication processes, including injection molding. The edges of each fiber channel 34 are kept smooth so as to avoid damaging the fiber cables.

FIG. 4 is a simplified side view of fiber shelf assembly 5, which shows fiber reels 44 and 45. Fiber shelf assembly 5 is broadly symmetrical about a centerline and, thus, the description of fiber reels 44 and 45 is directed to only one side of fiber shelf assembly 5 (e.g. side wall 18), with reference to the other side, only when necessary to describe a feature of the invention, since it is understood that the other end is structurally and functionally the same.

Fiber reels 44 and 45 are disposed on an external portion of side wall 18 proximate to fiber guide 38. In this embodiment, fiber reels 44 and 45 are positioned above and below one another, so that excess fiber cable may be wrapped around fiber reels 44 and 45 and stored. Optionally, fiber reels 44 and 45 may be positioned side-by-side. Fiber reels 44 and 45 have rounded cylindrical surfaces to ensure that the fiber cable is kept in a curved orientation which does not bend the fiber cables beyond acceptable limits. In one embodiment, the rounded portions of fiber reels 44 and 45 have a radius appropriate for whatever type of fiber cable is used with fiber shelf assembly 5. Fiber reels 44 and 45 can be spaced apart a distance $\lambda$, which ensures that the minimal bend radius for the fiber cable is not exceeded. In one embodiment, the distance $\lambda$ is between about 130 mm and about 150 mm; for example about 140 mm. Fiber reels 44 and 45 can be made from any structural material and may be formed using conventional fabrication processes. For example, fiber reels 44 and 45 may be made of plastic or light structural metals and may be machined, pressed, or molded. Reels 44 and 45 are mounted using conventional means, such as sheet metal screws or rivets.

Figure 5A:
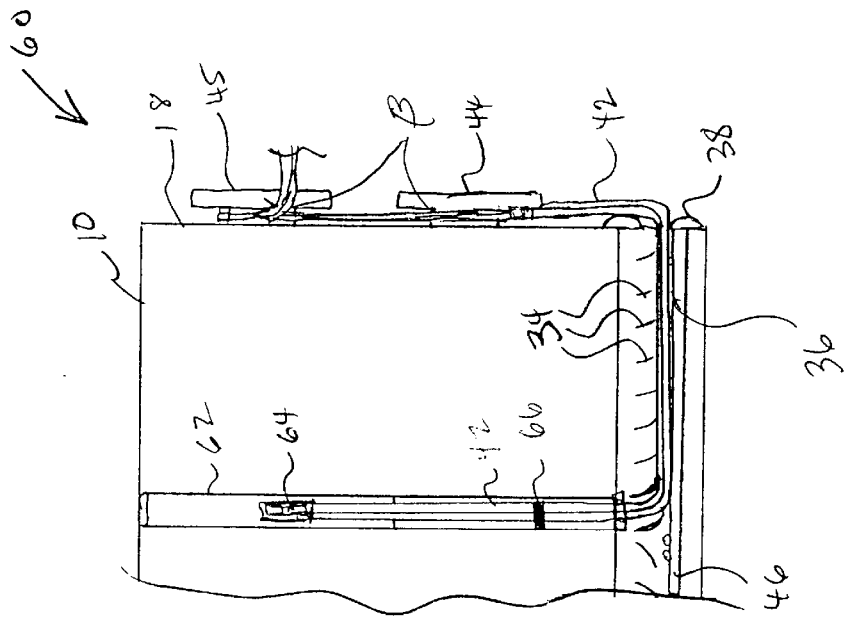
FIGS. 5A and 5B are simplified front and side views of the shelf assembly system of the present invention.
Figure 5B:
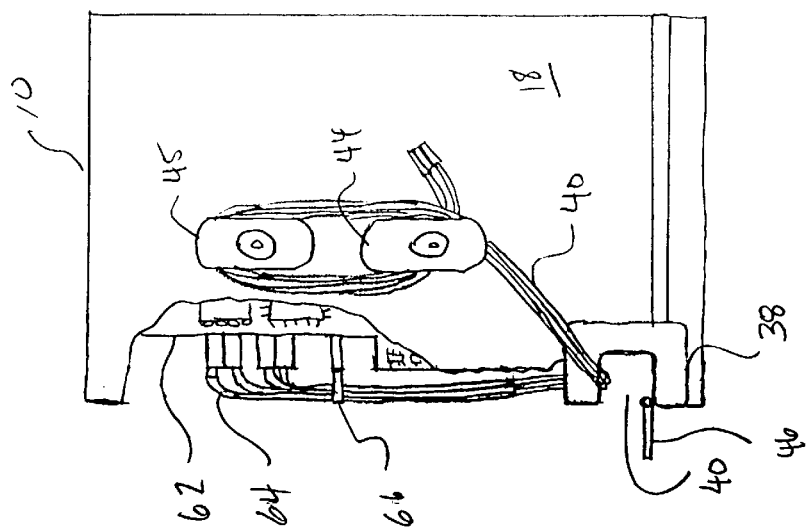

FIGS. 5A and 5B are simplified elevation and side views, respectively, of the system of the present invention. Shelf system 60 includes a card cage assembly 10, a plurality of fiber channels 34, a fiber guide 38, and first and second fiber reels 44 and 45. As illustrated in FIG. 5A, a transmission element 42, such as a fiber cable, is operatively coupled at mounting position 59 to a plug-in card 62, which may provide a telecommunications functionality to shelf system 60. Fiber cables 42 are threaded down from mounting position 59 along the end of card 62 to fiber trough 36. A fiber channel 34 disposed in fiber trough 36 urges fiber cables 42 to bend with a preselected bend radius, such that fiber cables 42 are guided into fiber trough 36. Fiber cables 42 are then threaded along fiber trough 36 toward one side wall of shelf assembly system 60, in this embodiment, side wall 18. Once fiber cables 42 reach side wall 18, they can be threaded out of card cage assembly 10 through opening 40 in fiber guide 38. Fiber cables 42 can then be operatively coupled to various electronic devices, as desired.

In one embodiment, when for example shelf system 60 is non-operative, it may be necessary to store fiber cables 42. As shown in FIG. 5B, fiber cables 42 can be routed from opening 40 to engage fiber reels 44 and 45 to be appropriately wrapped or coiled and stored, while maintaining an appropriate bend radius.

FIG. 5B also illustrates two optional components of the present invention. A bend radius retainer 64 can be used on fiber cables 42 to maintain a desired bend radius after fiber cable 42 is coupled to mounting position 59 and made to extend out and bend down toward fiber trough 36. Retainer 64 ensures that fiber cables 42 are not kinked or bent beyond acceptable limits at this juncture. Bend radius retainer 64 can be made of any structural material that has appropriate strength to maintain a preset curvature in a fiber cable. For example, retainer 64 may be made of an injection molded plastic or nylon.

Once fiber cables 42 are threaded down the end of card 62, the fiber cables may be held bunched together using a retaining clip 66. Retaining clip 66 may be mounted, for example, onto the end portion of card 62. In one embodiment, retaining clip 66 includes a ring and stem arrangement, where the stem is mounted to card 62 and extends the ring outward into the fiber cable path, such that fiber cables 42 can be threaded through the ring and held together. Optionally, the ring of retaining clip 66 can be made with a cinching mechanism, which can be used to cinch cables 42 together to keep the cables from straying away. Retaining clip 66 can be made of any suitable structural material, such as injection molded plastic or nylon.

The description of the invention given above is provided for purposes of illustration and is not intended to be limiting. The invention is set forth in the following claims.

What is claimed is:

1. A fiber cable management system comprising:
   a card cage assembly; and
   a fiber cable guiding mechanism to urge a fiber cable into a predetermined bend radius to facilitate routing of said fiber cable through said card cage assembly, said fiber cable guiding mechanism configured to be reversible between a first position, where said fiber cable is directed in a first direction through said card cage assembly, and a second position where said fiber cable is directed in a second direction through said card cage assembly.

2. The fiber cable management system of claim 1, wherein said card cage assembly is configured to house plug-in cards which provide a telecommunications functionality.

3. The fiber cable management system of claim 1, further comprising a fiber guide providing an opening for said fiber cable to enter and exit said fiber cage assembly.

4. The fiber cable management system of claim 3, wherein an inner surface of said fiber guide opening has a smooth cylindrical surface having a radius of between about 25 and 28 mm.

5. The fiber cable management system of claim 1, wherein each fiber channel has a radius of curvature of between 20 and 30 mm.

6. The fiber cable management system of claim 1, wherein said plurality of fiber channels are disposed in a fiber trough, said fiber trough providing a through way to an exit/entry opening.

7. The fiber cable management system of claim 1, further comprising a bend retainer mountable on said fiber cable to cause said fiber cable to bend to a predetermined bend radius.

8. The fiber cable management system of claim 1, further comprising a ring retainer for holding together a plurality of said fiber cables.

9. A fiber shelf assembly comprising:
   a card cage assembly defining an interior space for receiving plug-in cards having fiber cable mounting positions thereon; and
   means for guiding fiber cables from said mounting positions through said card cage assembly, said means being reversible.

10. The fiber shelf assembly of claim 9, wherein said guiding means comprises a plurality of fiber channels having a preselected curvature to urge said fiber cable to bend to a predetermined bend radius to facilitate said routing of said fiber cable through said card cage assembly.

11. A fiber shelf assembly comprising:
    a card cage assembly defining an interior space for receiving plug-in cards; and
    a plurality of fiber channels having a preselected curvature to guide a transmission element into a predetermined pathway to facilitate routing of said transmission element through said card cage assembly, each of said plurality of fiber channels configured to be reversible so as to direct said transmission element in either a first direction or a second direction.

12. The shelf assembly of claim 11, wherein said plug-in cards provide a telecommunications functionality.

13. The shelf assembly of claim 11, wherein said card cage assembly comprises a chassis coupled to a backplane having a plurality of connectors.

14. The shelf assembly of claim 11, further comprising a fiber guide providing an opening for said transmission element to enter and exit said card cage assembly.

15. The shelf assembly of claim 14, wherein an inner surface of said fiber guide has a smooth cylindrical surface having a radius of between about 25 mm and 28 mm.

16. The shelf assembly of claim 11, wherein each fiber channel has a radius of curvature of between 20 mm and 30 mm.

17. The shelf assembly of claim 11, wherein said plurality of fiber channels are disposed in-series in a fiber trough, said fiber trough providing a through way to an exit/entry opening.

18. The shelf assembly of claim 11, further comprising a bend retainer mountable on said transmission element to cause said transmission element to bend to a predetermined bend radius.

19. The shelf assembly of claim 11, further comprising a ring retainer for holding together a plurality of said transmission elements.

20. The shelf assembly of claim 11, wherein said transmission element comprises a fiber cable including optical fibers.

* * * * *